United States Patent
Ando et al.

(10) Patent No.: US 11,586,041 B2
(45) Date of Patent: Feb. 21, 2023

(54) VIRTUAL IMAGE DISPLAY DEVICE

(71) Applicant: DENSO CORPORATION, Kariya (JP)

(72) Inventors: Hiroshi Ando, Kariya (JP); Kazuhisa Onda, Kariya (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 16/585,270

(22) Filed: Sep. 27, 2019

(65) Prior Publication Data
US 2020/0103651 A1    Apr. 2, 2020

(30) Foreign Application Priority Data

Oct. 1, 2018 (JP) ............................. JP2018-186672

(51) Int. Cl.
*G02B 27/01* (2006.01)
*G02B 27/42* (2006.01)
*G02B 5/18* (2006.01)

(52) U.S. Cl.
CPC ....... *G02B 27/0103* (2013.01); *G02B 5/1842* (2013.01); *G02B 5/1861* (2013.01); *G02B 5/1866* (2013.01); *G02B 27/4205* (2013.01); *G02B 27/4261* (2013.01); *G02B 2027/0107* (2013.01); *G02B 2027/0145* (2013.01)

(58) Field of Classification Search
CPC .............. G02B 27/0103; G02B 5/1842; G02B 5/1861; G02B 5/1866; G02B 27/4205; G02B 27/4261; G02B 2027/0107; G02B 2027/0145
USPC .................................................. 359/13, 630
See application file for complete search history.

(56) References Cited

U.S. PATENT DOCUMENTS

| | | | | | |
|---|---|---|---|---|---|
| 5,812,233 | A | * | 9/1998 | Walsh .................. | G02B 5/3083 349/183 |
| 5,903,396 | A | * | 5/1999 | Rallison ............. | G02B 27/0101 359/630 |
| 6,137,602 | A | * | 10/2000 | Mukawa .................. | G02B 5/32 345/8 |
| 2002/0093736 | A1 | * | 7/2002 | Ori ....................... | G02B 27/283 359/485.02 |

(Continued)

FOREIGN PATENT DOCUMENTS

| JP | S62-094816 A | 5/1987 |
|---|---|---|
| JP | H04-240686 A | 8/1992 |

(Continued)

*Primary Examiner* — Audrey Y Chang
(74) *Attorney, Agent, or Firm* — Posz Law Group, PLC

(57) ABSTRACT

A diffractive optical element exerts a diffractive action on a display light that is emitted from a display unit. A folding mirror is provided on the opposite side of the diffractive optical element from the display unit to reflect the display light. The diffractive optical element includes a transmissive action part and a diffractive and reflective action part. The transmissive action part exerts a transmissive action to transmit therethrough the display light, which is incident from the display unit and is in a first polarization state, toward the folding mirror. The diffractive and reflective action part exerts a diffractive and reflective action to diffract and reflect the display light, which is reflected by the folding mirror and is in a second polarization state opposite to the first polarization state, toward the projection portion on an optical path.

19 Claims, 13 Drawing Sheets

(56) References Cited

U.S. PATENT DOCUMENTS

| | | | |
|---|---|---|---|
| 2006/0181769 A1* | 8/2006 | Kumasawa | G03B 21/62 |
| | | | 359/449 |
| 2010/0091349 A1* | 4/2010 | Ito | G11B 7/128 |
| | | | 359/30 |
| 2011/0050727 A1* | 3/2011 | Mukawa | G09G 5/00 |
| | | | 345/636 |
| 2019/0041641 A1* | 2/2019 | Christmas | G02B 27/0103 |

FOREIGN PATENT DOCUMENTS

| | | |
|---|---|---|
| JP | H04-355713 A | 12/1992 |
| JP | 08-123333 A | 5/1996 |
| JP | 2017-015805 A | 1/2017 |

* cited by examiner

VIRTUAL IMAGE DISPLAY DEVICE

CROSS REFERENCE TO RELATED APPLICATION

The present application claims the benefit of priority from Japanese Patent Application No. 2018-186672 filed on Oct. 1, 2018. The entire disclosures of all of the above applications are incorporated herein by reference.

TECHNICAL FIELD

The present disclosure relates to a virtual image display device configured to display a virtual image to be visible.

BACKGROUND

Conventionally, a known virtual image display device mounted on a vehicle is configured to project an image on a windshield to indicate a virtual image.

SUMMARY

According to an aspect of the present disclosure, a virtual image display device is configured to project a display light of an image on a projection portion thereby displaying a virtual image to be visible. The virtual image display unit includes a display unit, an optical element, and a folding mirror. The display unit is configured to emit a display light. The optical element is configured to exert an optical action on the display light. The folding mirror is provided on an opposite side of the diffractive optical element from the display unit and is configured to reflect the display light.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
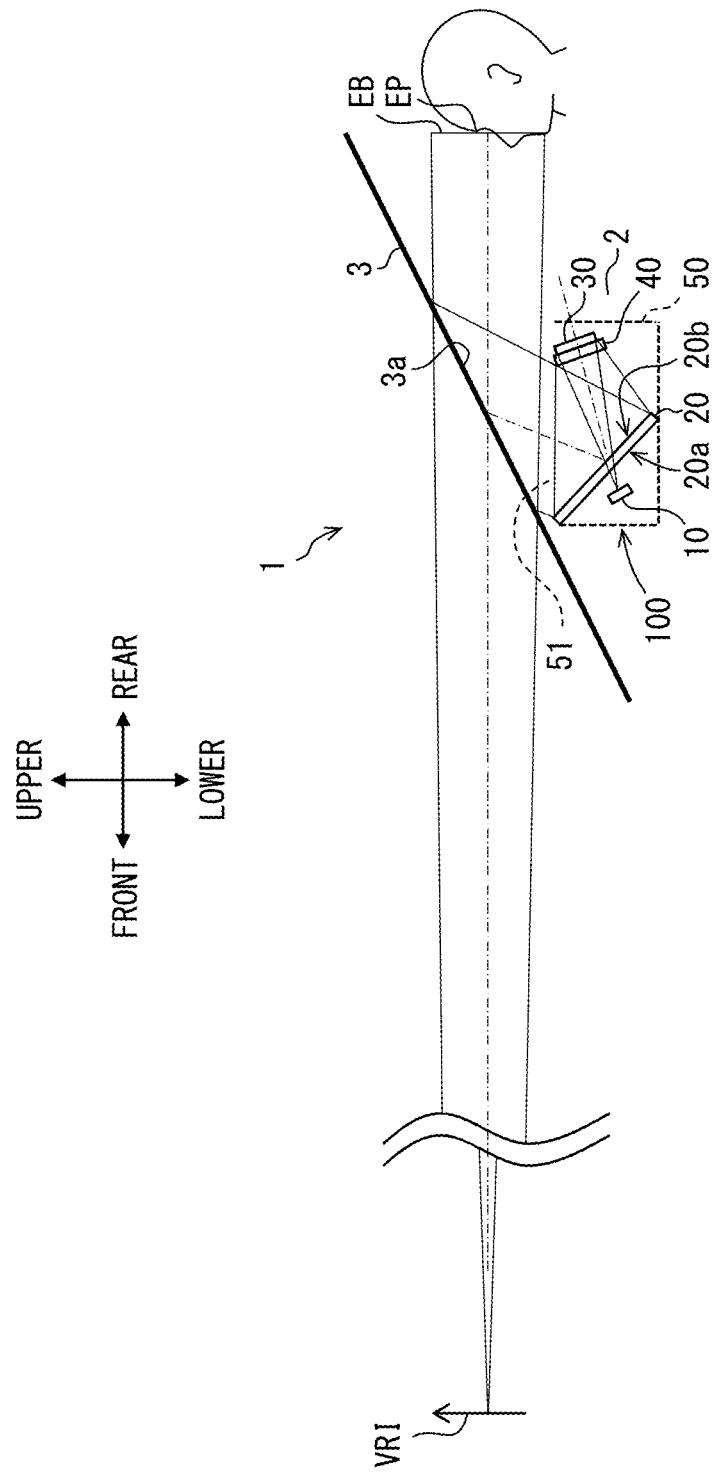
FIG. 1 is a schematic view showing an HUD device mounted on a vehicle according to a first embodiment.

Hereinafter, an example of the present disclosure will be described. A virtual image display device according to an example of the present disclosure projects a display light of an image on a projection portion, thereby displaying a virtual image to be visible. The virtual image display device according to this example includes a projector, a concave mirror, and a folding mirror. The concave mirror defines in part a half mirror region formed with a half mirror. The folding mirror is placed on the opposite side of the projector across the concave mirror and is configured to reflect the display light.

The display light from the projector is incident on the half mirror region and is in part transmitted toward the folding mirror. The light reflected by the folding mirror enters the concave mirror again and is reflected toward the projection portion.

However, the display light forming a part of the virtual image according to this example is transmitted once through the half mirror region and is further reflected once. Therefore, the display light is attenuated to, for example, about half each time the transmission and the reflection occur. That is, the display light is attenuated to a quarter or less, and therefore, the efficiency could be low. Therefore, this example may not have a configuration that is sufficiently suitable for the virtual image display.

A virtual image display device according to an example of the present disclosure projects a display light of an image on a projection portion, thereby displaying a virtual image to be visible. The virtual image display unit includes a display unit, a diffractive optical element, and a folding mirror. The display unit is configured to emit a display light. The diffractive optical element is configured to exert a diffractive action on the display light. The folding mirror is provided on an opposite side of the diffractive optical element from the display unit and is configured to reflect the display light. The diffractive optical element includes a transmissive action part and a diffractive and reflective action part. The transmissive action part is configured to exert a transmissive action to transmit therethrough the display light, which is incident from the display unit and is in a first polarization state, toward the folding mirror. The diffractive and reflective action part is configured to exert a diffractive and reflective action to diffract and reflect the display light, which is reflected by the folding mirror and is in a second polarization state opposite to the first polarization state, toward the projection portion on an optical path.

According to this example, the display light emitted from the display unit in the first polarization state first enters the diffractive optical element. In the diffractive optical element, the display light in the first polarization state is transmitted toward the folding mirror while being exerted with a transmission action through the transmissive action part. In the configuration of the present embodiment, the display light reflected by the folding mirror enters the diffractive optical element again in the second polarization state that is opposite to the first polarization state. In the diffractive optical element, the display light in the second polarization state is diffracted and reflected toward the projection portion by the diffractive and reflective action of the diffractive and reflective action part. In this way, the folded optical path of the display light is formed. Therefore, this configuration enables to increase the length of the optical path for the size of the virtual image display device.

Further, the present embodiment using the diffractive optical element enables to appropriately set the transmittance and the reflectance with respect to the incidence of the display light on the diffractive optical element twice in different polarization states. Therefore, even in the configuration in which the transmission and the reflection are combined in order to gain the optical path, the configuration enables to suppress loss of the display light. Therefore, the configuration enables to enhance efficiency of utilization of the display device. Thus, the virtual image display unit suitable for the virtual image display can be provided.

DETAILED DESCRIPTION

Hereinafter, multiple embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even when they are not explicitly shown as long as there is no difficulty in the combination in particular.

First Embodiment

As shown in FIG. 1, a virtual image display device according to a first embodiment of the present disclosure is used for a vehicle 1. The virtual image display unit housed in an instrument panel 2 of the vehicle 1 is a head-up display unit (hereinafter referred to as an HUD device) 100. The HUD device 100 projects a display light of an image toward a projection portion 3a defined on a windshield 3 of the vehicle 1. In this way, the HUD device 100 displays a virtual image so that the image is visible by an occupant as a viewer of the vehicle 1. In other words, the display light of the image reflected on the windshield 3 reaches a visible region EB defined in the interior of the vehicle 1. An occupant whose eye point EP is located in the visible region EB perceives the display light as a virtual image VI. The occupant is enabled to recognize various types of information displayed as the virtual image VRI. The various types of information, which is displayed as the virtual image, may be exemplified by information that represents a state of the vehicle 1 such as a vehicle speed and/or a remaining fuel. The information may be further exemplified by visibility assisting information and/or navigation information such as road information.

In the following description, forward, backward, forward and backward directions, upward, downward, upward and downward directions, leftward, rightward, and rightward and leftward directions are expressed with respect to the vehicle 1 on the horizontal plane as a reference plane unless otherwise specified.

The windshield 3 of the vehicle 1 is formed of, for example, a synthetic resin or a glass to be a translucent plate. The windshield 3 is placed above the instrument panel 2. The windshield 3 is inclined such that the closer to the rear relative to the front, the more the windshield 3 is distant from the instrument panel 2. The windshield 3 has a projection portion 3a on which the display light is projected. The projection portion 3a is in a smooth concave shape or in a planar shape.

The visible region EB is a spatial region that is visually recognizable such that the virtual image VRI displayed by the HUD device 100 satisfies a predetermined standard in a case where, for example, the entirety of the virtual image VRI has a predetermined luminance or higher. The visible region EB is also referred to as an eye box. Typically, the visual recognition region EB is defined so as to overlap with an eyelips that is defined in the vehicle 1. The eyelips is in an ellipsoidal form defined based on an eye range that statistically represents a spatial distribution of the eye point EP of an occupant.

A specific configuration of the HUD device 100 will be described below. The HUD device 100 is configured of a display unit 10, a hologram element 20, a folding mirror 30, a ¼ wavelength plate 40, and the like. These components are accommodated in, for example, an interior of a housing 50 that has a light shielding property and formed in a hollow shape. The housing 50 has a window portion 51 that optically opens on the upper side. The window portion 51 may be closed with a translucent dustproof sheet or the like in order to restrict foreign matter from entering the interior of the housing 50.

Figure 2:
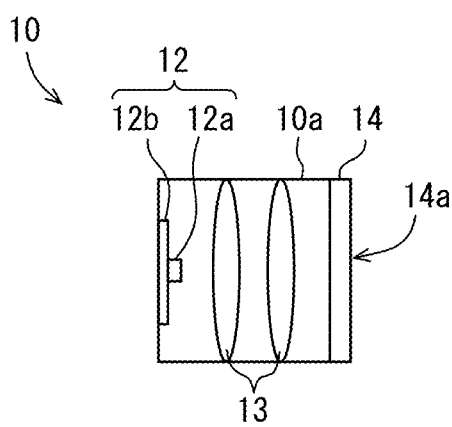
FIG. 2 is a schematic view showing a configuration of a display unit according to the first embodiment.

The display unit 10 displays an image to be formed as a virtual image VRI. The display unit 10 of the present embodiment is a liquid crystal display as shown in FIG. 2 in detail. The display unit 10 includes a backlight 11 and a liquid crystal panel 14 accommodated in, for example, a casing 10a that is in a box shape. The backlight 11 includes, for example, a light source unit 12, a lens unit 13, and the like.

The light source unit 12 includes, for example, light emitting elements 12 that are arranged in one direction or in two directions. The light emitting elements 12a according to the present embodiment are light emitting diode elements, respectively, that are arranged on a light source circuit board 12b and are connected to a power supply. Each of the light emitting elements 12a emits a light by a light emission amount corresponding to a current amount caused by energization. More specifically, in each light emitting elements 12a, for example, a blue light emitting diode is covered with a yellow phosphor, thereby to materialize light emission in a pseudo white color.

The lens unit 13 is a combination of, for example, a condenser lens and a field lens. The lens unit 13 condenses a light incident from the light source unit 12 and emits the light toward the liquid crystal panel. In addition to the above configuration, various configurations may be employed as the configuration of the backlight 11.

The liquid crystal panel 14 according to the present embodiment is a liquid crystal panel formed of a thin film transistor (TFT). The liquid crystal panel 14 is, for example, an active matrix liquid crystal panel formed of multiple liquid crystal pixels that are arrayed in two directions. In the liquid crystal panel 14, a pair of linearly polarizing plates, a liquid crystal layer sandwiched between the pair of linearly polarizing plates, and the like are stacked each other. Each of the linearly polarizing plates has a property to transmit a polarized light in the direction along the transmission axis and to block a polarized light in a direction along an absorption axis which is orthogonal to the transmission axis. The pair of linearly polarizing plates are placed so that those transmission axes are substantially orthogonal to each other. The liquid crystal layer is enabled to rotate the polarization direction of the light incident on the liquid crystal layer in accordance with an applied voltage caused by application of a voltage to each liquid crystal pixel.

The liquid crystal panel 14 receives light incident from the backlight 11 and regulates a transmittance of light for each liquid crystal pixel thereby to form an image with the display light emitted from the display screen 14a. Adjacent liquid crystal pixels are provided with color filters in different colors (for example, red, green, and blue), respectively, and are enabled to materialize various colors in combinations of those color filters. Herein, the display light is emitted, as a linear polarized light along the transmission axis of the linear polarizing plate on the display screen 14a, from the display screen 14a. The display light according to the present embodiment is mainly composed of light of a wavelength in the range of 380 to 780 nm. The display screen 14a also corresponds to a real image plane on which a real image of the image is displayed.

Figure 3:
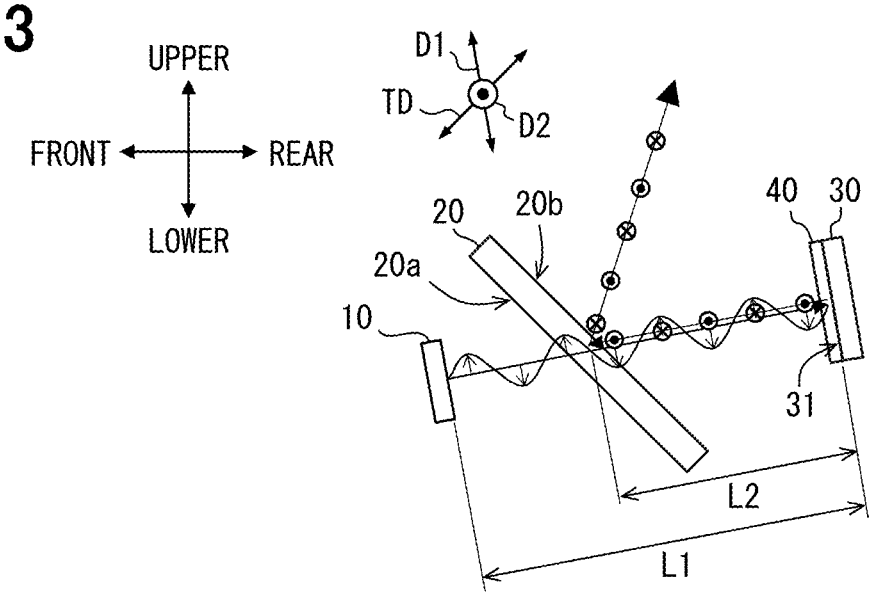
FIG. 3 is a schematic view showing a configuration of an optical system of the HUD device according to the first embodiment.

As shown in FIGS. 2 and 3, a plate-shaped hologram element 20 is provided in a space that faces the display screen 14a of the liquid crystal panel 14. The hologram element 20 is arranged to be inclined at a predetermined angle with the display screen 14a. The display light from the display unit 10 is incident on the surface 20a of the hologram element 20 on the side of the display unit 10. The display light incidents, as the above-described linear polarized light, in a first polarization state. In the present embodiment, the transmission axis of the linear polarization plate on the side of the display screen 14a is along a first direction D1. That is, in the present embodiment, the linear polarized light in the first polarization state is polarized in the first direction D1.

The hologram element 20 is a type of a diffractive optical element configured to cause a diffractive operation in the display light. More specifically, the hologram element 20 includes a medium having a periodic refractive index distribution. For example, a volume type hologram element may be employed as the hologram element 20 in consideration of a diffraction efficiency, a wavelength selectivity, and the like. The hologram element 20 is formed particularly in a flat plate shape by, for example, sandwiching a hologram layer 21 between a pair of transmission substrate layers (not shown). The hologram layer 21 is a medium layer that forms the refractive index distribution.

The pair of transmission substrate layers is formed of, for example, a synthetic resin or a glass having a light transmitting property in a thin plate shape and ensures the strength of the hologram element 20.

The hologram layer 21 is formed in advance in a state where information of an amplitude and a phase of an object light is recorded as interference fringes with respect to a reference light in a hologram material. These interference fringes are caused by the above-described periodic refractive index distribution. The hologram material may be a material mainly composed of a synthetic resin, a gelatin photosensitive material, or a silver halide photosensitive material, or the like. The hologram material may be a material enabled to selectively record information of the amplitude and the phase of the object light by using a spatial modulation of the refractive index. The hologram material may be a material having a birefringence.

Herein, a first cross section CS1 and a second cross section CS2 are defined particularly in the hologram layer 21 of the hologram element 20. The first cross section CS1 is defined as a cross section including the thickness direction TD of the hologram element 20 and the first direction D1. The second cross section CS2 is defined as a cross section including the thickness direction TD of the hologram element 20 and a second direction D2 that is substantially perpendicular to the first direction D1. The thickness direction TD of the hologram element 20 is defined as a direction perpendicular to the surfaces 20a and 20b of the hologram element 20.

Figure 4:
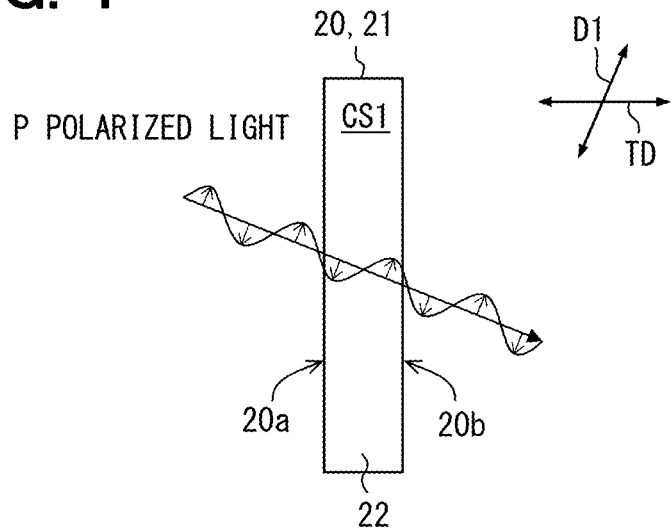
FIG. 4 is a schematic cross-sectional view for explaining a refractive index distribution in a first cross section of a hologram element according to the first embodiment.

The display light emitted from the display unit 10 and polarized in the first direction D1 is exerted with an interaction with the hologram layer 21 in accordance with the refractive index distribution due to the refractive index in the direction that is along the first cross section CS1 and on the first cross section CS1. As shown in FIG. 4, on the first cross section CS1 of the hologram layer 21 according to the present embodiment, substantially no refractive index modulation arises in the refractive index distribution, and the refractive index is a refractive index np uniformly. As a result, the display light from the display unit 10 passes through the hologram layer 21 but hardly causes reflection or substantial change in its direction (also referred to as deflection), even though the display light is exerted with an interaction, such as a decrease in speed in accordance with the refractive index in the hologram layer 21.

Therefore, the display light from the display unit 10 incident in the first polarization state is transmitted through the hologram layer 21 while being exerted with a transmissive action by the transmissive action part 22. The transmissive action part 22 is materialized by the refractive index distribution in the first cross section CS1. In addition, the transmission substrate layer also has a function to transmit the display light. Therefore, most of the display light from the display unit 10 is transmitted through the hologram element 20.

In the present embodiment, the display light incident from the display unit 10 on the hologram element 20 is a P-polarized light with respect to the hologram element 20.

As shown in FIG. 3, a folding mirror 30 is provided on the opposite side of the display unit 10 across the hologram element 20. Therefore, the display light passing through the hologram element 20 is directed to the folding mirror 30.

The folding mirror 30 is a folding mirror in which a metal film is formed as the reflecting surface 31 on a surface of a base material by depositing a metal such as aluminum. The base material is made of, for example, a synthetic resin or a glass. In the present embodiment, the reflecting surface 31 is formed in a flat planar shape.

The folding mirror 30 folds an optical path of the display light by reflecting the display light, which has been incident from the display unit 10 and transmitted through the hologram element 20, toward the hologram element 20 again.

Herein, a ¼ wavelength plate 40 is provided between the hologram element 20 and the folding mirror 30. More specifically, the ¼ wavelength plate 40 of the present embodiment is installed in a state of being adhered to the reflection surface 31 of the folding mirror 30.

The ¼ wavelength plate 40 is an optical element that generates a phase difference by substantially a ¼ wavelength between the polarized light along an advanced axis and the polarized light along the retarded axis. The ¼ wavelength plate 40 of the present embodiment is set corresponding to any wavelength (380 to 780 nm) of the display light from the display unit 10. The phase difference by the ¼ wavelength is a phase difference included in the range of 95 to 195 nm when converted to a distance. The ¼ wavelength plate 40 is formed of, for example, a birefringent material in a plate shape or a film shape. The advanced axis and the retarded axis of the ¼ wavelength plate 40 are arranged so as to define an angle of substantially 45 degrees with respect to the first direction D1 and the second direction D2.

Therefore, the display light going back and forth between the hologram element 20 and the folding mirror 30 passes through the ¼ wavelength plate 40 twice in total in the forward path and in the backward path. Specifically, the display light is converted from the linear polarized light polarized in the first direction D1 into a clockwise circular polarized light or an anticlockwise circular polarized light by the interaction of the ¼ wavelength plate 40 in the forward path. Subsequently, before and after being reflected by the folding mirror 30, the display light becomes an inverted circular polarized light. Due to the interaction of the ¼ wavelength plate 40 in the return path, the display light is converted from the inverted circular polarized light into a linear polarized light polarized in the second direction D2.

In the present embodiment, the linear polarized light polarized in the second direction D2 is defined to be in a second polarization state that is a polarization state opposite to the first polarization state. Herein, the opposite polarization state represents a polarization state at a position on the Poincare sphere on the opposite side of the other polarization state across the center of the Poincare sphere. Therefore, a relationship between the linear polarized light that is polarized in a predetermined direction and a linear polarized light that is polarized in a direction perpendicular to the predetermined direction represents the opposite. In another example, the relationship between the clockwise circular polarized light and the anticlockwise circular polarized light also represents the opposite.

Note that the first polarization state and the second polarization state are not necessarily located at the opposite positions across the center of the Poincare sphere interposed therebetween and may be located at slightly shifted positions.

As described above, the ¼ wavelength plate 40 functions as a polarization state conversion element that converts the display light from the first polarization state into the second polarization state in other words. Therefore, the display light, as the linearly polarized light polarized in the second direction D2 in the second polarization state, is reflected to the folding mirror 30 to enter the surface 20b of the hologram element 20 on the side of the folding mirror 30.

Figure 5:
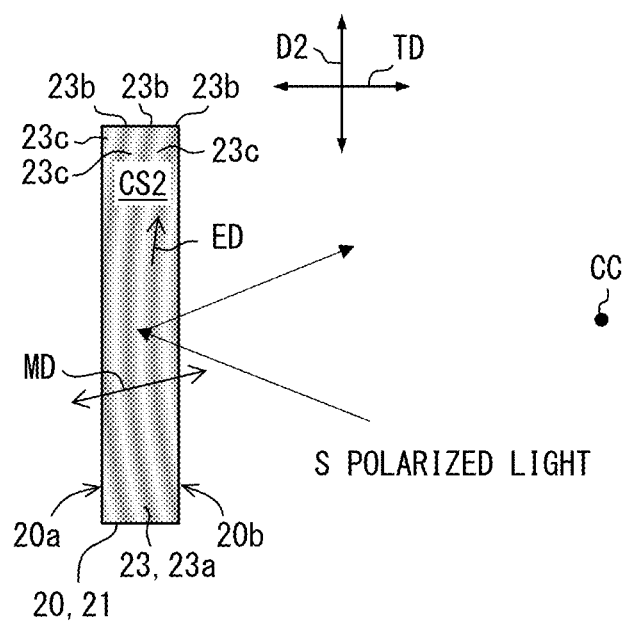
FIG. 5 is a schematic cross-sectional view for explaining a refractive index distribution in a second cross section of the hologram element according to the first embodiment and showing a modulation in a refractive index of interference fringes with shading in color.
Figure 6:
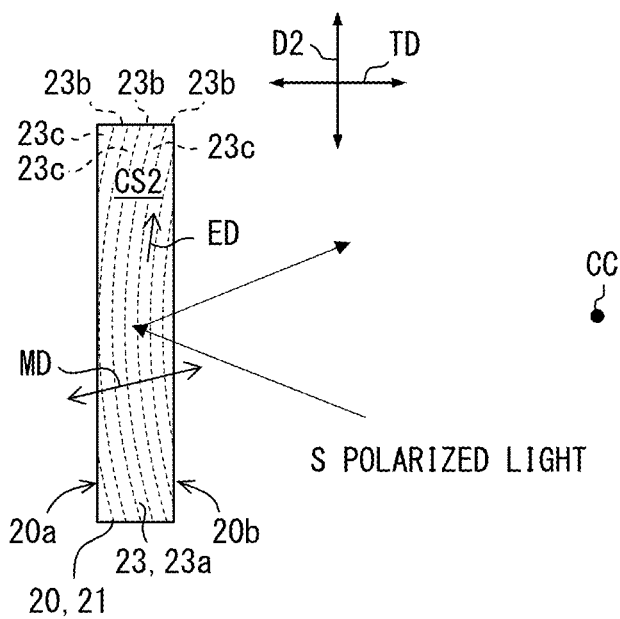
FIG. 6 is a view showing the modulation in the refractive index of the interference fringes with dashed lines instead of the shading in color in FIG. 5.

The display light returning from the folding mirror 30 and polarized in the second direction D2 is exerted with an interaction with the hologram layer 21 in accordance with the refractive index distribution due to the refractive index in the direction that is along the second cross section CS2 and on the second cross section CS2. As shown in FIGS. 5 and 6, a periodic refractive index distribution arises on the second cross section CS2 in the hologram layer 21 of the present embodiment. Specifically, in the present embodiment, ring-shaped interference fringes 23a are formed with respect to a virtual curvature center CC that is set closer to the folding mirror 30 than the hologram element 20. In addition, a refractive index distribution is developed on the second cross section CS2 such that the interference fringes 23a are arranged along the radial direction with respect to the curvature center CC. That is, the radial direction with respect to the virtual curvature center CC is a modulation direction MD of the refractive index distribution.

The interference fringes 23a are formed with a band-like region 23b and a band-like region 23c that are repeated periodically and alternately. In the band-like region 23b, the refractive index is greater than a median ns in the cycle of the refractive index. In the band-like region 23c, the refractive index is smaller than the median ns in the cycle of the refractive index. It is formed by repeating periodically and alternately. The band-like regions 23b and 23c extend generally along the surfaces 20a and 20b of the hologram element 20 while being curved. For example, the extending direction ED of each of the band-like regions 23b and 23c is represented by a vector. In the substantially all region on the second cross section CS2, the vector has a component, which is along a surface direction perpendicular to the thickness direction TD, larger than a component along the thickness direction TD.

Figure 7:
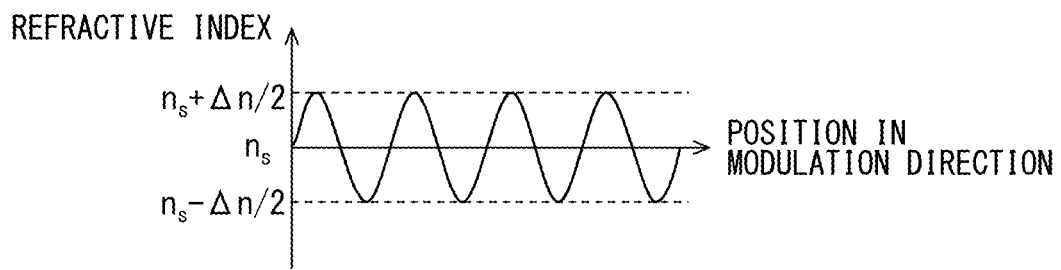
FIG. 7 is a graph showing a relationship between the position in a modulation direction and the refractive index in the refractive index distributions in FIGS. 5 and 6.

As shown in FIG. 7, the refractive index in the radial direction is modulated in a range of ns±Δn/2 at a predetermined cycle P such that the refractive index is modulated along, for example, a sine curve. Herein, assuming that the incident angle of the display light from the folding mirror 30 to the hologram element 20 is θ, and that the refraction angle (internal angle) of the display light in the hologram element 20 is θ', relationships of sin θ'=sin θ/ns and 2·ns·P·cos θ'=λ are made. For this reason, the period P is represented by P=λ/(2·ns·cos θ'"ns±Δn/2"). Therefore, in a case where the incident angle θ is set in a range of 0 to 55 degrees, the period P is in a range of λ/2.5 to λ/3. In a case where λ is in a range of 126 to 312 nm and where θ=30 degrees, the period P is set in the range of 134 to 276 nm. The median ns of the refractive index may be the same as or different from the refractive index np on the first cross section CS1. The amplitude Δn/2 depends on the hologram material as used but is set in a range of, for example, 0.01 to 0.1.

It is noted that, the concentric ring shape in this embodiment includes not only a complete concentric ring with respect to the one center of the curvature but also a shape close to a concentric ring in which the curvatures of the band-like regions 23b and 23c are modulated. By modulating the curvatures, correction of the aberration is enabled adaptively to the shape of the windshield 3. In FIGS. 5 and 6, the interference fringes 23a are schematically illustrated, and the cycle is not accurately illustrated. In addition, the solid arrows indicating how the display light travels also schematically show the state of the transmission or the reflection, and those directions are not accurately illustrated. The same applies to FIGS. 10, 11, 14 to 19.

In this way, the refractive index distribution that causes Bragg diffraction with respect to the display light is formed on the second cross section CS2. The refractive index distribution causes Bragg diffraction while slightly changing a diffraction angle of each wavelength among a large number of wavelengths (preferably all wavelengths) in the range of 380 to 780 nm. In this case, the diffraction angle may be referred to as a reflection angle. As a result, the display light from the folding mirror 30 is diffracted and reflected by the hologram element 20. In this diffractive reflection, the first-order diffracted light having a higher diffraction efficiency than that of the higher order diffracted light is used.

Therefore, the display light from the folding mirror 30 incident in the second polarization state is exerted with a diffractive and reflective action (effect) by the diffractive and reflective action part 23 embodied with the refractive index distribution on the second cross section CS2. The display light is diffracted and reflected toward the projection portion 3a on the optical path.

In the present embodiment, the belt-like regions 23b and 23c are curved. Therefore, the diffraction angle of Bragg diffraction changes depending on the position to which the display light is incident on the hologram element 20. More specifically, the band-like regions 23b and 23c are curved with respect to the folding mirror 30 so as to be concaved toward the display unit 10. Therefore, the display light diffracted and reflected by the diffractive and reflective action unit 23 is converged. In other words, the positive optical power is given to the diffractive reflecting portion 23. Therefore, the display light is subjected to enlargement to enlarge the image to be displayed as the virtual image, as the display light is diffracted and reflected.

In the present embodiment, the display light incident from the folding mirror 30 on the hologram element 20 is the S-polarized light with respect to the hologram element 20.

Herein, as shown in FIG. 3, the distance L1 is from the display screen 14a of the display unit 10 to the reflecting surface 31 of the folding mirror 30. In addition, the distance L2 is from the hologram element 20 to the reflecting surface 31 of the folding mirror 30. The optical path of the display light from the display screen 14a via the folding mirror 30 to the hologram element 20 on which the display light is expanded has substantially the distance L1+L2. Therefore, the optical path can be enlarged with respect to the size of the HUD device 100 by the distance L2 as the return path from the folding mirror 30.

(Operation Effect)

The operation effect of the first embodiment as described above will be described below.

According to the first embodiment, the display light emitted from the display unit 10 first enters the hologram element 20 that is the diffractive optical element, in the first polarization state. In the hologram element 20, the display light in the first polarization state is transmitted therethrough toward the folding mirror 30 while being exerted with the transmissive action of the transmissive action part 22. In the configuration of the present embodiment, the display light reflected by the folding mirror 30 enters the hologram element 20 again in the second polarization state that is opposite to the first polarization state. In the hologram element 20, the display light in the second polarization state is diffracted and reflected toward the projection portion 3a by the diffractive and reflective action of the diffractive and reflective action part 23. In this way, the folded optical path of the display light is formed. Therefore, this configuration enables to increase the length of the optical path with respect to the size of the HUD device 100 that is virtual image display device.

Further, the present embodiment using the hologram element 20 enables to appropriately set the transmittance and the reflectance with respect to the incidence of the display light on the hologram element 20 twice in different polarization states. Therefore, even in the configuration in which the transmission and the reflection are combined in order to gain the optical path, the configuration enables to suppress loss of the display light. Therefore, the configuration enables to enhance efficiency of utilization of the display light. Thus, the HUD device 100 suitable for the virtual image display can be provided.

In the diffractive reflection caused by the diffractive and reflective action unit 23, unlike the regular reflection, the diffractive structure enables to control the reflection angle. Therefore, for example, the arrangement of the hologram element 20 can be made at an angle at which the surface reflection on the surfaces 20a and 20b of the hologram element 20 hardly occurs during the transmission.

In addition, according to the first embodiment, the diffractive and reflective action part 23 exerts magnification effect on the display light to enlarge the image along with its diffraction and reflection. The magnification effect is materialized by the diffraction structure suitable for the installation space of the HUD device 100 without being restricted by the shape of the reflection curved surface in normal regular reflection. Therefore, the configuration enables to display the virtual image VRI as a large image for the size of the HUD device 100. Therefore, the configuration enables to produce the HUD device 100 suitable for displaying the virtual image.

Further, in a case where the hologram element 20 of the first embodiment employs a medium layer (for example, the hologram layer 21) formed of a medium having a birefringence, the refractive index distribution in the first cross section CS1 including the first direction D1 and the refractive index distribution in the second cross section CS2 including the second direction D2 can be made differentiated from each other completely. In the medium layer, the transmissive action part 22 is materialized by the refractive index distribution in the first cross section CS1, which is interactive with the linear polarized light polarized in the first direction D1 in the first polarization state, and the diffractive and reflective action part 23 is materialized by the refractive index distribution in the second cross section CS2, which is interactive with the linearly polarized light polarized in the second direction D2 in the second polarization state. In this way, the transmissive action part 22 and the diffractive and reflective action part 23 with high performance can be made in the singular medium layer. Therefore, the configuration enables to render the HUD device 100 suitable for virtual image display.

Further, according to the first embodiment, the refractive index distribution in the second cross section CS2 is made with the concentric ring-shaped interference fringes 23a with respect to the center of curvature CC located closer to the folding mirror 30 than the hologram element 20. In this way, the diffraction angle of Bragg reflection varies depending on the incident position of the display light on the hologram element 20. The concentric ring-shaped interference fringes 23a diffract and reflect the display light while condensing the display light to focus the display light on the side closer to the folding mirror 30 than the hologram element 20. This condensing enlarges the size of the virtual image VRI thereby to enable to display the virtual image VRI as a large image for the size of the HUD device 100. Therefore, the configuration enables to render the HUD device 100 suitable for the virtual image display.

Further, according to the first embodiment, in the refractive index distribution in the first cross section CS1, the refractive index is substantially uniform. In this way, the display light from the display unit 10 is hardly exerted with an influence such as reflection, diffusion, and the like caused by the modulation of the refractive index. Therefore, the transmissive action part 22 materializes a high transmittance rate. Thus, the configuration enables to enhance an utilization efficiency of the display light.

In addition, according to the first embodiment, the ¼ wavelength plate 40 is further provided between the hologram element 20 and the folding mirror 30. The ¼ wavelength plate 40 serves as a polarization state conversion element that converts the display light in the first polarization state to the display light in the second polarization state. In this configuration, the polarization state of the display light, which has been transmitted through the hologram element 20, is converted in the polarization state until the display light is returned from the return mirror 30 and is incident on the hologram element 20 again. Therefore, the display light in the second polarization state after being converted can be diffracted and reflected with a high reflectance. Thus, the configuration enables to enhance an utilization efficiency of the light.

Further, according to the first embodiment, the ¼ wavelength plate 40 is placed in a state of being adhered to the reflection surface 31 of the folding mirror 30. The integration of the ¼ wavelength plate 40 and the folding mirror 30 facilitates the positioning of the components and enhances the positional accuracy of the optical system for displaying the virtual image. Therefore, the configuration enables to materialize the virtual image VRI in a high and stable display quality.

According to the first embodiment, the diffractive optical element is the hologram element 20. The transmissive action part 22 and the diffractive and reflective action part 23 of the hologram element 20 can be easily manufactured by using exposure.

Second Embodiment

As shown in FIGS. 8 to 11, a second embodiment is a modification of the first embodiment. The second embodiment will be described mainly on configurations different from those of the first embodiment.

Figure 8:
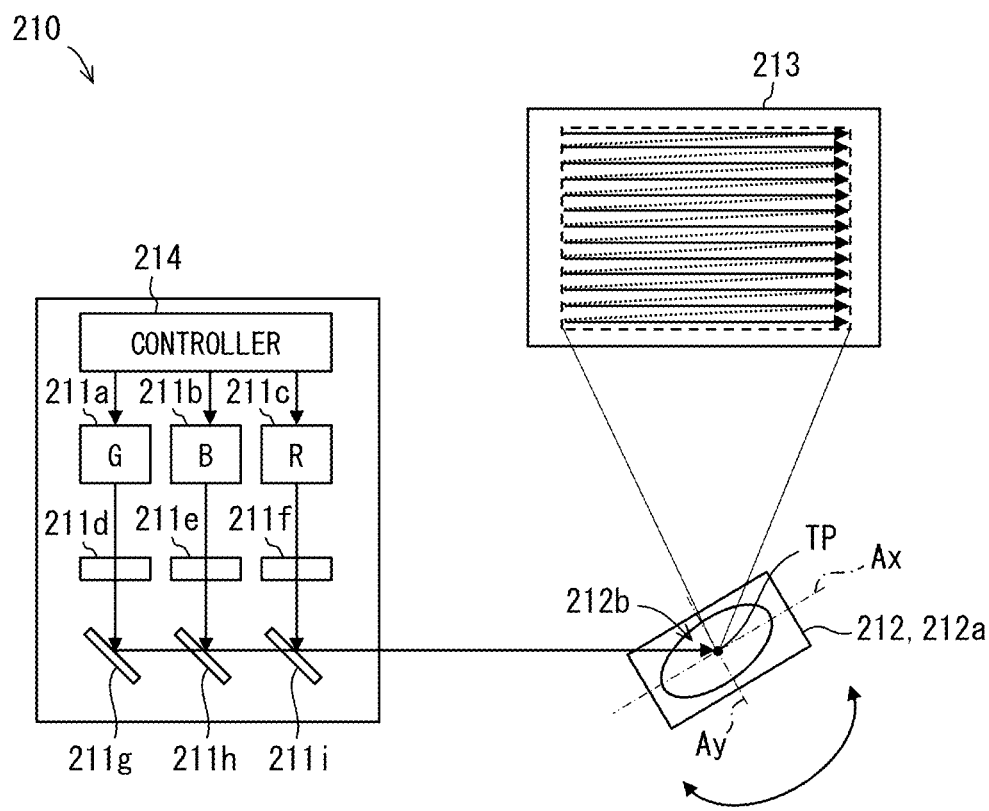
FIG. 8 is a schematic view showing a configuration of a display unit according to a second embodiment.

The display unit 210 of the second embodiment employs a laser scanner shown in FIG. 8. The display unit 210 includes a laser projection unit 211, a scanning unit 212, and a screen 213.

The laser projection unit 211 includes multiple laser oscillators 211a, 211b, and 211c, multiple condenser lenses 211d, 211e, and 211f, a folding mirror 211g, and multiple dichroic mirrors 211h and 211i. In the present embodiment, three laser oscillators 211a, 211b, and 211c and three condenser lenses 211d, 211e, and 211f are provided, and two dichroic mirrors 211h and 211i are provided.

The three laser oscillators 211a, 211b, and 211c are, for example, laser diodes and are narrow band light sources that oscillate laser beams having different wavelengths. Specifically, the laser oscillator 211a oscillates a laser beam having a green wavelength and having a peak wavelength in a range of, for example, 500 to 560 nm, preferably 540 nm. The laser oscillator 211b oscillates a laser beam having a blue wavelength and having a peak wavelength in a range of, for example, 430 to 470 nm, preferably 450 nm. The laser oscillator 211c oscillates a laser beam having a red wavelength and having a peak wavelength in a range of, for example, 600 to 650 nm, preferably 640 nm.

The laser beams oscillated with the laser oscillators 211a, 211b, and 211c are collected with the condenser lenses 211d, 211e, and 211f respectively corresponding to the laser oscillators 211a, 211b, and 211c, and subsequently are overlapped each other with the folding mirror 211g and the dichroic mirrors 211h and 211i respectively.

Each of the laser oscillators 211a, 211b, 211c is electrically connected to the controller 214 and oscillates the laser beam in accordance with an electric signal from the controller 214. Various colors can be reproduced by adding and mixing the three color laser beams emitted from the laser oscillators 211a, 211b, and 211c respectively.

The scanning unit 212 includes a scanning mirror 212a. The scanning mirror 212a is a MEMS mirror having an electro micro mechanical system (MEMS) and configured to scan the laser beam timewise. The reflection surface 212b formed on the scanning mirror 212a receives a scanning signal from the controller 214 electrically connected thereto and is configured to turn about two rotation axes Ax and Ay that are substantially orthogonal to each other.

The overlapped laser beams are incident on the reflective surface 212b. The controller 214 controls the scanning mirror 212a thereby to enable to deflect and scan the laser beam timewise in conjunction with the laser projection unit 211 with respect to a deflection point TP as a start point. The deflection point TP is an incident position of the laser light beam on the reflecting surface 212b. In this way, the laser beam is scanned on the screen 213.

The screen 213 is a member on which an image is displayed as a virtual image by scanning the laser beam. The screen 213 may be a micro mirror array that is a reflective screen, a micro lens array that is a transmissive screen, or the like. The display light is emitted toward the hologram element 220 to be the drawn image, and a spread angle of the laser beam corresponding to the pixels of the image is increased on the screen 213 in which those optical elements are provided in an array form. A real image surface for displaying a real image is formed on or near the screen 213.

Figure 9:
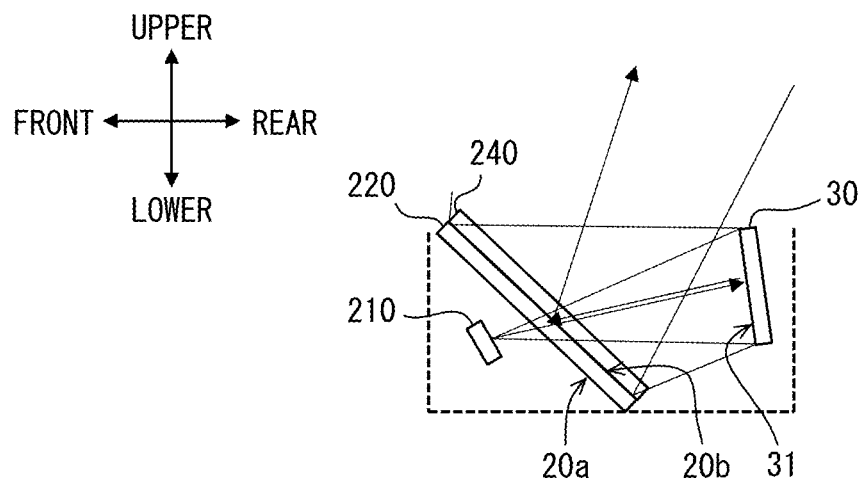
FIG. 9 is a schematic view showing a configuration of an optical system of the HUD device according to the second embodiment.

As shown in FIG. 9, the ¼ wavelength plate 240 of the second embodiment is attached to the surface 20b of the hologram element 220 on the side of the folding mirror 30. Therefore, similarly to the first embodiment, the display light goes back and forth between the hologram element 220 and the folding mirror 30 and passes through the ¼ wavelength plate 240 in the forward path and in the backward path twice in total.

Further, in the arrangement of the ¼ wavelength plate 240, the display light is diffracted and reflected with the hologram element 220 and subsequently passes through the ¼ wavelength plate 240 once in an optical path toward the projection portion 3a. In this transmission, the display light is converted from the linearly polarized light polarized in the second direction D2 to substantially a circularly polarized light. For this reason, the display light reflected by the projection portion 3a and reaching the visual recognition area EB is not a linearly polarized light, and therefore, the virtual image VRI can be perceived satisfactorily even when the occupant who is the viewer wears a polarized sunglasses.

Figure 10:
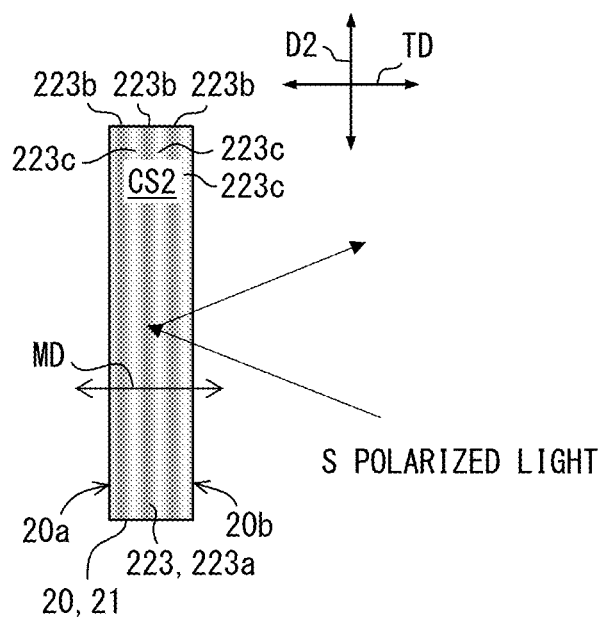
FIG. 10 is a schematic cross-sectional view for explaining a refractive index distribution in a second cross section of the hologram element according to the second embodiment and showing a modulation in a refractive index of interference fringes with shading in color.
Figure 11:
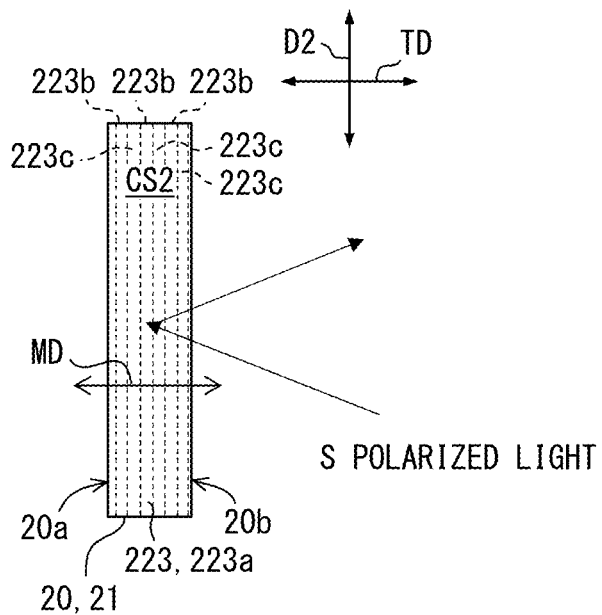
FIG. 11 is a view showing the modulation in the refractive index of the interference fringes with dashed lines instead of the shading in color in FIG. 10.

As shown in FIGS. 10 and 11, in the refractive index distribution in the second cross section CS2 of the hologram layer 221 of the second embodiment, the band-like regions 223b and 223c of the interference fringe 223a are inclined relative to the surfaces 20a and 20b of the hologram element 220 at an angle smaller than 45 degrees and linearly extends. A direction at an angle of less than 45 degrees with respect to the thickness direction TD is a modulation direction MD of the refractive index distribution. Particularly in the present embodiment, the direction coincides with the thickness direction TD.

In a case where the interference fringes 223a are linearly formed not to be bent, the diffraction angles of Bragg diffraction are substantially the same regardless of the position on the hologram element 220 where the display light is incident. Therefore, the diffractive and reflective portion 223 has no optical power.

No optical power is given to the diffractive and reflective action part 223. Therefore, in the transmission of the ¼ wavelength plate 240 after being diffracted and reflected with the hologram element 220, variation in the length of the optical path passing through the ¼ wavelength plate 240 caused depending on the reflection position is suppressed. Therefore, the polarization state of the display light incident on the projection portion 3a also becomes relatively uniform. Therefore, the configuration enables to restrain a luminance unevenness of the image displayed as the virtual image.

According to the second embodiment described above, the ¼ wavelength plate 240 as the polarization state conversion element is provided in the state of being adhered to the surface 20b of the hologram element 220, which is the diffractive optical element, on the side of the folding mirror 30. The integration of the ¼ wavelength plate 240 and the hologram element 220 facilitates the positioning of those components and enhances the positional accuracy of the optical system for displaying the virtual image. Therefore, the configuration enables to materialize the virtual image VRI in a high and stable display quality.

Third Embodiment

Figure 12:
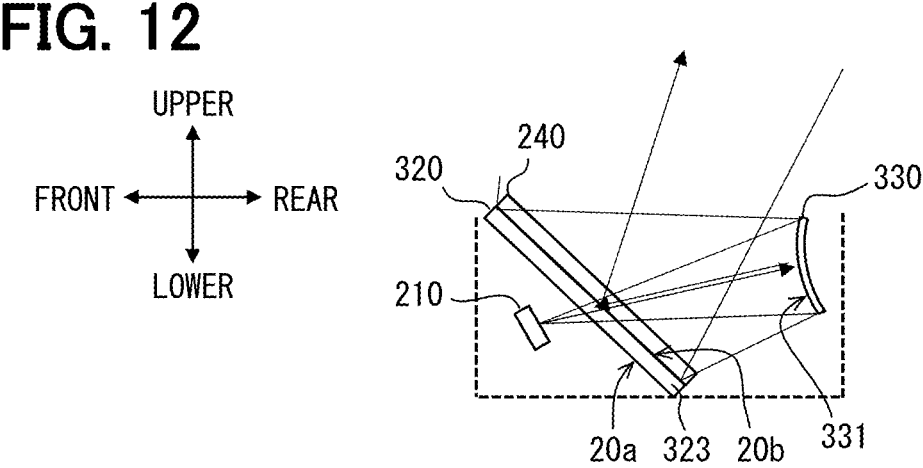
FIG. 12 is a schematic view showing a configuration of an optical system of the HUD device according to a third embodiment.

As shown in FIG. 12, a third embodiment is a modification of the first embodiment. The third embodiment will be described mainly on configurations different from those of the first embodiment.

A display unit 210 of the third embodiment employs the laser scanner that is the same as that of the second embodiment.

In the folding mirror 330 of the third embodiment, the reflective surface 331 is formed in a smooth curved surface that is curved in a convex shape and protrudes toward the hologram element 20. Therefore, the folding mirror 330 has a negative optical power.

The ¼ wavelength plate 240 of the third embodiment is adhered to the surface 20b of the hologram element 20 on the side of the folding mirror 30 similarly to the second embodiment. Therefore, similarly to the first embodiment, the display light goes back and forth between the hologram element 20 and the folding mirror 30 and passes through the ¼ wavelength plate 240 in the forward path and in the backward path twice in total. Further, the display light is diffracted and reflected with the hologram element 20 and subsequently passes through the ¼ wavelength plate 240 once in an optical path toward the projection portion 3a.

The hologram element 320 of the third embodiment has the configuration same as that of the hologram element 20 of the first embodiment. It is noted that, in the hologram element 320 of the third embodiment, the positive optical power of the diffractive and reflective action unit 323 is made larger than that of the first embodiment in correspondence with the negative optical power of the folding mirror 330. The sum of the negative optical power of the folding mirror 330 and the positive optical power of the diffractive and reflective action unit 323 is positive.

According to the third embodiment described above, the reflecting surface 331 of the folding mirror 330 is formed in a convex shape. The adjustment of the power of the diffractive and reflective action part 323 in correspondence with the convex reflection surface 331 enables to reduce the size of the reflection surface 331 while ensuring the size of the virtual image VRI.

Fourth Embodiment

As shown in FIGS. 13 to 17, a fourth embodiment is a modification of the first embodiment. The fourth embodiment will be described mainly on configurations different from those of the first embodiment.

Figure 13:
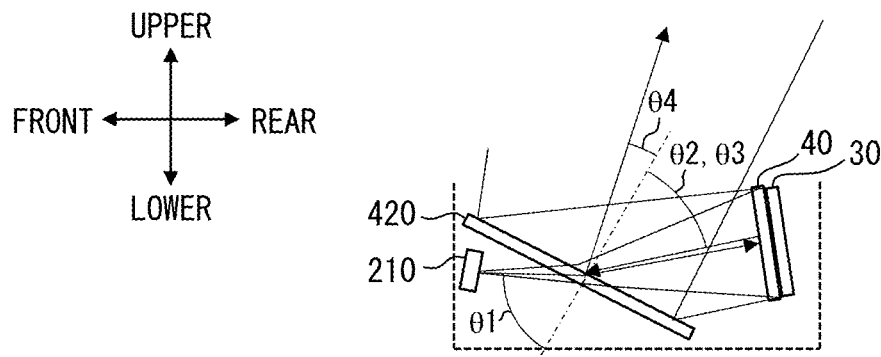
FIG. 13 is a schematic view showing a configuration of an optical system of the HUD device according to a fourth embodiment.

As shown in FIG. 13, a display unit 210 of the fourth embodiment employs the laser scanner that is the same as that of the second embodiment.

Figure 14:
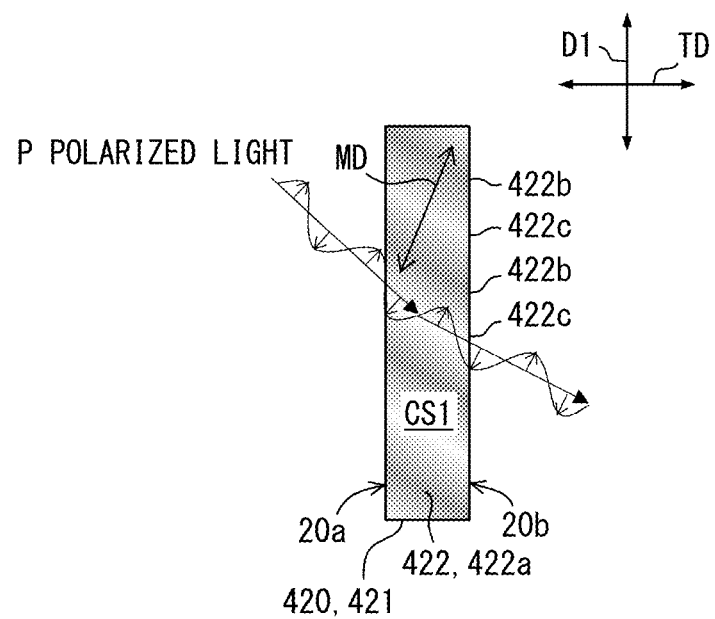
FIG. 14 is a schematic cross-sectional view for explaining a refractive index distribution in a first cross section of the hologram element according to the fourth embodiment and showing a modulation in a refractive index of interference fringes with shading in color.
Figure 15:
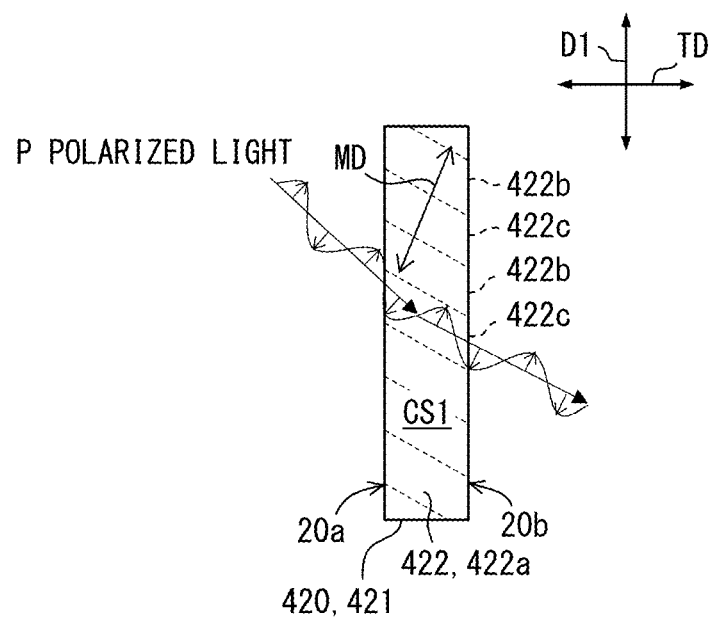
FIG. 15 is a view showing the modulation in the refractive index of the interference fringes with dashed lines instead of the shading in color in FIG. 14.

The fourth embodiment is different from that of the first embodiment in the structure of the hologram element 420. Specifically, as shown in FIGS. 14 and 15, a periodic refractive index distribution arises in a first cross section CS1 of the hologram layer 421 in the fourth embodiment due to interference fringes 422a. Specifically, in the present embodiment, each of band-like regions 422b and 422c is inclined at an angle larger than 45 degrees with respect to the surfaces 20a and 20b of the hologram element 420 and linearly extends. That is, the direction inclined at the angle smaller than 45 degrees with respect to the thickness direction TD is the modulation direction MD of the refractive index distribution.

In this configuration, the display light incident from the display unit 210 in the first polarization state is subjected to a transmission action exerted by the transmission unit 422 that has the refractive index distribution in the first cross section CS1. It is noted that, this transmission action is accompanied by a diffractive action. This diffractive action works to deflect the display light such that the traveling direction of the display light is bent to an angle less than, for example, 45 degrees with respect to linear transmission.

Figure 16:
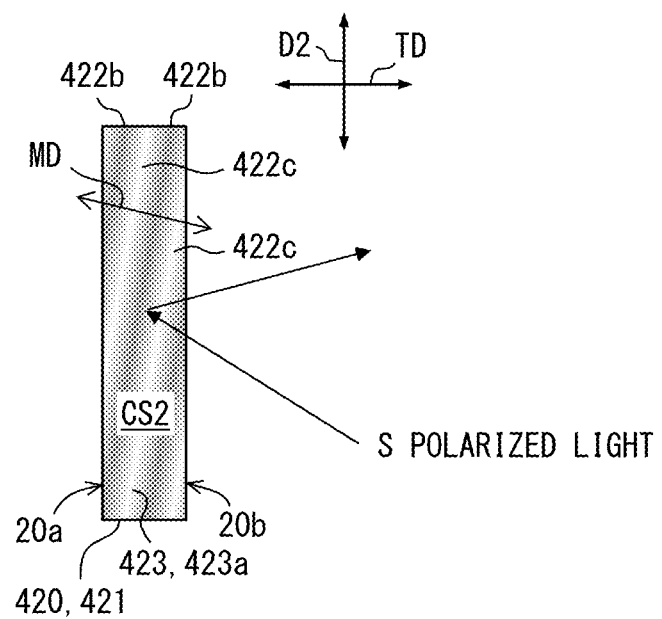
FIG. 16 is a schematic cross-sectional view for explaining a refractive index distribution in a second cross section of the hologram element according to the fourth embodiment and showing a modulation in a refractive index of interference fringes with shading in color.
Figure 17:
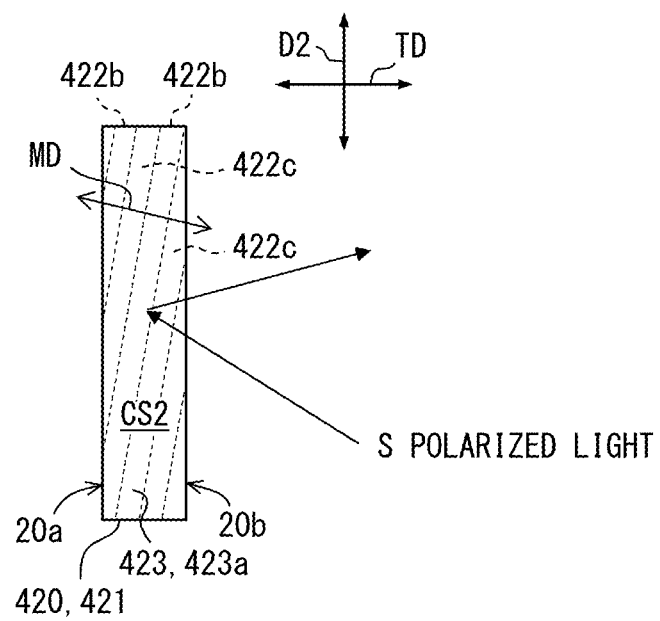
FIG. 17 is a view showing the modulation in the refractive index of the interference fringes with dashed lines instead of the shading in color in FIG. 16.

On the other hand, as shown in FIGS. 16 and 17, on the second cross section CS2 of the hologram layer 421, a periodic refractive index distribution arises due to the interference fringes 423a. Specifically, in the present embodiment, each of band-like regions 422b and 422c is inclined at an angle smaller than 45 degrees with respect to the surfaces 20a and 20b of the hologram element 420 and linearly extends. That is, the direction inclined at the angle larger than 45 degrees with respect to the thickness direction TD is the modulation direction MD of the refractive index distribution.

The refractive action part 423 of the present embodiment is materialized by this refractive index distribution. A diffractive and reflective action works on the display light from the folding mirror 30 in the second polarization state. It is noted that, the reflection direction of the first-order diffracted light caused by Bragg reflection is different from the direction of the regular reflection on the surface 20b, that is, different from the direction of the surface reflection, due to the inclination of the refractive index distribution described above. Details of the condition such as the reflection angle will be described below.

Here, as shown in FIG. 13, the relationship between angles defined on a cross section along the vertical plane along the front-rear direction of the vehicle 1 (corresponding to the first cross section CS1 in this embodiment) will be described. In this cross section, the display light in the first polarization state from the display unit 210 enters the hologram element 420 at an incident angle θ1. The angle θ1 is an angle formed on the upper side with respect to the normal line of the surface 20a of the hologram element 420. Thereafter, the display light is emitted from the hologram element 420 at an emission angle θ2 after being exerted with the transmission action and the diffractive action. Furthermore, the display light in the second polarization state from the folding mirror 30 enters the hologram element 420 at an incident angle θ3. Thereafter, the display light is diffracted and reflected by the hologram element 420 at a reflection angle θ4 due to the diffractive and reflective action.

In this embodiment, a condition of θ1>θ2 and a condition of θ3>θ4 are satisfied. Furthermore, the sum of θ1 and θ4 is set to 90 degrees or more. In this embodiment, the folding mirror 30 reflects the display light in the same direction. Therefore, a relation of θ2=θ3 is substantially satisfied.

According to the fourth embodiment described above, the refractive index distribution in the first cross section CS1 is formed with the interference fringes 22a. In the interference fringes 22a, the modulation direction MD of the refractive index is inclined at the angle smaller than 45 degrees with respect to the thickness direction TD of the hologram element 420. In this way, the configuration enables to exert a diffractive action on the display light when the display light, which is linearly polarized in the first direction D1 in the first polarization state passes through the hologram element 420 toward the folding mirror 30. Therefore, the configuration enables to enhance the display quality of the virtual image VRI by exerting the diffractive action on the display light.

In addition, according to the fourth embodiment, the transmission action unit 422 exerts the diffractive action to diffract the display light to bend the traveling direction of the display light, which is in the first polarization state and is incident from the display unit 210, along with the transmission action. In this way, the configuration enables to bend the traveling direction of the display light simultaneously with transmitting the display light through the hologram element 420. Therefore, the display unit 210 can be placed at a position correspondingly to the bending action. For this reason, a freedom degree of placement of the display unit 210 can be increased.

Further, according to the fourth embodiment, the relation of θ3>θ4 is satisfied. Since this inequation is satisfied, the hologram element 420 can be laid down, and therefore, the height of the HUD device 100 can be reduced. In addition, the width of the optical path of the display light, which is incident on the hologram element 420 and before being exerted with the diffraction and reflection, can be set smaller than the width of the optical path of the display light, which is emitted from the hologram element 420 after being exerted with the diffraction and reflection. This configuration enables to reduce the size of the reflecting surface 31 of the folding mirror 30 with respect to the size of the visible region EB.

Further, according to the fourth embodiment, the relation of θ1>θ2 is satisfied. Since this inequality is satisfied, the width of the optical path of the display light, which is incident from the display unit 210 on the hologram element 420 before transmission can be set smaller than the width of the optical path of the display light emitted from the hologram element 420 to the folding mirror 30 after the transmission. This configuration enables to reduce the size of the display unit 210 relative to the size of the visual recognition area EB.

Further, according to the fourth embodiment, the sum of θ1 and θ4 is 90 degrees or more. That is, the normal line of the real image plane of the image displayed on the display unit 210 is 90 degrees or more with respect to the traveling direction of the light beam at the angle θ4. Therefore, a viewer, who visually recognizes the virtual image VRI from the viewing area EB, is disabled to observe the real image plane of the image displayed on the display unit 210 through the hologram element 420. In this way, the configuration enables to restrain the display image from being unintendedly superimposed on the virtual image VRI that is displayed through the folding mirror 30. Therefore, the configuration enables to enhance the display quality of the virtual image VRI.

Fifth Embodiment

Figure 18:
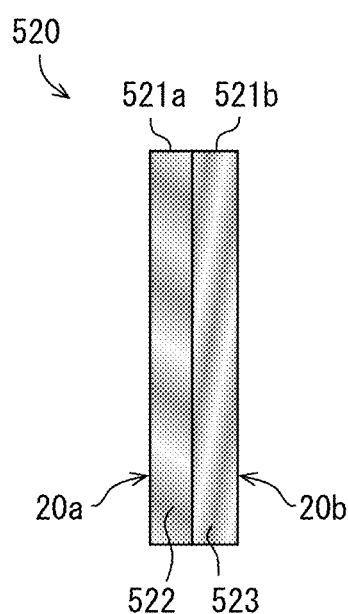
FIG. 18 is a view for explaining a refractive index distribution of the hologram element according to the fifth embodiment and showing a modulation in a refractive index of interference fringes with shading in color.
Figure 19:
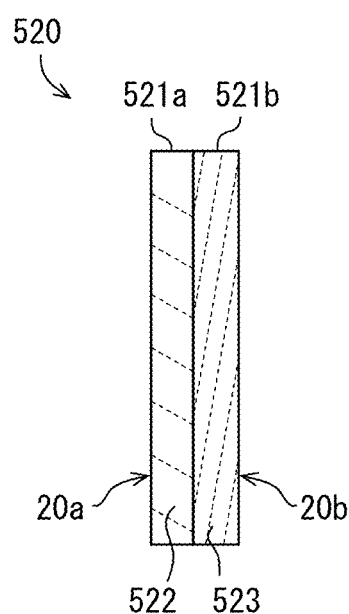
FIG. 19 is a view showing the modulation in the refractive index of the interference fringes with dashed lines instead of the shading in color in FIG. 18.

As shown in FIGS. 18 and 19, a fifth embodiment is a modification of the first embodiment. The fifth embodiment will be described mainly on configurations different from those of the first embodiment.

In the fifth embodiment, the hologram element 520 includes multiple (specifically, two of) hologram layers 521a and 521b that are stacked one another. The hologram layer 521a of the two hologram layers 521a and 521b is placed on the side of the display unit 210. A refractive index distribution arises on the the first cross section CS1 of the hologram layer 521a similarly to that in the first cross section CS1 of the hologram layer 421 of the fourth embodiment. In this way, the transmissive action part 522 that transmits the display light with a diffractive action is embodied by the refractive index distribution in the first cross section CS1 of the hologram layer 421. In the second cross section CS2 of the hologram layer 521a, the refractive index distribution may be uniform such that substantially no modulation arises in the refractive index in the refractive index distribution. Alternatively, a refractive index distribution may arise such that an arbitrary modulation arises.

The hologram layer 521b of the two hologram layers 521a and 521b is placed on the side of the folding mirror 30. A refractive index distribution arises on the the second cross section CS2 of the other hologram layer 521b similarly to that in the second cross section CS2 of the hologram layer 521a, 521b of the fourth embodiment. In this way, the diffractive and reflective action part 523 is embodied by the refractive index distribution in the second cross section CS2 of the hologram layer 521b. In the hologram layer 521b, the refractive index is not substantially modulated in the refractive index distribution in the first cross section CS1, and the refractive index is uniform. It is noted that, an arbitrary refractive index distribution may arise in the first cross section CS1 when an influence on the display light, which is incident through the surface 20a at the angle of θ1, is small.

According to the fifth embodiment described above, the hologram element 520 that is a diffractive optical element includes the hologram layer 521a and the hologram layer 521b. The hologram layer 521a that is a first medium layer embodies the transmissive action part 522 by the refractive index distribution in the first cross section CS1 including the first direction D1. The hologram layer 521b that is a second medium layer is stacked on the hologram layer 521a and embodies the diffractive and reflective action part 523 by the refractive index distribution in the second cross section CS2 including the second direction D2. In this configuration, the hologram layers 521a and 521b having the different action parts 522 and 523 can be manufactured separately and can be combined with each other subsequently. Therefore, accuracy of the refractive index distribution can be enhanced. As a result, the configuration enables to steadily materialize the virtual image VRI with a high display quality.

Other Embodiments

Although multiple embodiments have been described above, the present disclosure is not construed as being limited to these embodiments, and can be applied to various embodiments and combinations within a scope that does not depart from the gist of the present disclosure.

Specifically, as a first modification, the display light incident on the hologram element 20 from the display unit 10 in the first polarization state may be S-polarization instead of P-polarization. The display light incident on the hologram element 20 from the folding mirror 30 may be P-polarized light instead of S-polarized light. Further, in the first polarization state and the second polarization state, the display light may be a linearly polarized light that is polarized in a direction that obliquely intersects the incident surface.

As a second modification related to the fourth embodiment, two interference fringes may be recorded in a multiplex way on a singular hologram layer 421. In this way, the diffractive and reflective action part 423 may be embodied by one of the interference fringes. The transmissive action part 422 exerting a diffraction action may be embodied by the other of the interference fringes in a modulation direction MD that avoids interference with Bragg reflection on the diffractive and reflective action part 423. It is noted that, in a case where interference fringes are recorded in a multiplex way, ghosts may be caused due to an unnecessary diffraction. Therefore, from a viewpoint of suppressing ghosts, it could be preferable to form a single interference fringe in the single hologram layer.

As a third modification, a hologram element 20 may be employed wherein by using a special material for the hologram material, clockwise circular polarization or counterclockwise circular polarization is made in the first polarization state, and circular polarization opposite to the first polarization state is made in the second polarization state.

As a fourth modification, the diffractive optical element may not be the hologram element 20 produced by photosensitivity. For example, the hologram element 20 may be an element having a refractive index distribution in its medium produced by a method other than the exposure to light. Further, for example, the diffractive optical element may be materialized by a mechanical grating structure having anisotropy.

As a fifth modification, the hologram element 20 itself may have a function to convert the display light in the first polarization state to be in the second polarization state. In this case, a polarization state conversion element may not be provided separately. For example, a part of the hologram layer 21 on the side of the folding mirror may have a function to give a phase difference to the display light.

As a sixth modification, the folding mirror 30 may be a dichroic mirror configured to reflect a light, which has a wavelength and is diffracted and reflected by the hologram layer 21, and a light, which has a wavelength close to the wavelength. The dichroic mirror may transmit a light having the other wavelengths.

As a seventh modification, the projection portion 3a may not be provided to the windshield 3. For example, a combiner, which is a separate component from the vehicle 1, may be placed on an upper surface of the instrument panel 2, and the projection portion 3a may be provided to the combiner. The combiner may be manufactured by forming an optical multilayer film on a surface of a light-transmitting plate-like base material, such as, glass or synthetic resin so as to reflect a light having a specific wavelength and to transmit a light having other wavelengths. Here, the specific wavelength is set to a wavelength at which the hologram element 20 exerts the diffractive action on a light having a specific wavelength among the display light emitted from the display unit 10.

As an eighth modification, the virtual image display device may be applied to various vehicles such as an aircraft, a ship, or a casing (for example, a game casing) that does is not movable.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A virtual image display device configured to project a display light of an image on a projection portion to display a virtual image to be visible, the virtual image display unit comprising:
    a display unit configured to emit a display light, the display unit including a display screen and at least one polarizing plate;
    a diffractive optical element configured to exert a diffractive action on the display light;
    a folding mirror provided on an opposite side of the diffractive optical element from the display unit and configured to reflect the display light, wherein
    the diffractive optical element includes:
    a transmissive action part configured to exert a transmissive action to transmit therethrough the display light, which is incident from the display unit and is in a first polarization state, toward the folding mirror; and
    a diffractive and reflective action part configured to exert a diffractive and reflective action to diffract and reflect the display light, which is reflected by the folding mirror and is in a second polarization state opposite to the first polarization state, toward the projection portion on an optical path,
    wherein
    the display light in the first polarization state is a linearly polarized light polarized in a first direction,
    the display light in the second polarization state is a linearly polarized light polarized in a second direction orthogonal to the first direction, the diffractive optical element has a medium layer formed of a medium having a birefringence, the transmissive action part has a periodic refractive index distribution in a first cross section including the first direction in the medium layer to exert a diffractive action due to interference fringes including a plurality of band-like regions to bend a traveling direction of the display light toward the folding mirror, a transmission axis of the linear polarizing plate on a side of the display screen of the display unit is along a first direction, each of the band-like regions is inclined at an angle larger than 45 degrees with respect to surfaces of the diffractive optical element in a counterclockwise direction when viewed along a second direction, which is perpendicular to the first direction and a thickness direction of the diffractive optical element and linearly extends, and the diffractive and reflective action part has a refractive index distribution in a second cross section including the second direction in the medium layer.

2. The virtual image display device according to claim 1, wherein
the diffractive and reflective action part is configured to exert an enlargement action on the display light to enlarge the image while diffracting and reflecting the display light.

3. The virtual image display device according to claim 1, wherein
the display light in the first polarization state is a linearly polarized light polarized in a first direction, and
the display light in the second polarization state is a linearly polarized light polarized in a second direction orthogonal to the first direction,
the diffractive optical element includes:
a first medium layer that forms the transmissive action part and has a refractive index distribution in a first cross section that includes the first direction; and
a second medium layer that is stacked on the first medium layer, the second medium layer forming the diffractive and reflective action part and having a refractive index distribution in a second cross section that includes the second direction.

4. The virtual image display device according to claim 1, wherein
the refractive index distribution in the second cross section is defined by a concentric ring-shaped interference fringe with respect to a center of curvature located closer to the folding mirror than the diffractive optical element.

5. The virtual image display device according to claim 1, wherein
the refractive index distribution in the first section is defined by interference fringes modulated in a refractive index modulation direction that is inclined at an angle smaller than 45 degrees with respect to a thickness direction of the diffractive optical element.

6. The virtual image display device according to claim 5, wherein
in a cross section taken along the vertical plane,
the display light is incident from the display unit in the first polarization state on the diffractive optical element at an incident angle $\theta_1$, wherein the incident angle $\theta_1$ is defined on an upper side with respect to a normal line of the diffractive optical element, the display light passes through the diffractive optical element toward the folding mirror at an emission angle $\theta_2$, and
the incident angle $\theta_1$ and the emission angle $\theta_2$ satisfy a relation of $\theta_1 > \theta_2$.

7. The virtual image display device according to claim 6, wherein
in a cross section taken along the vertical plane,
the display light, which is diffracted and reflected by the diffractive optical element, is emitted toward the projection portion at a reflection angle $\theta_4$, and
a sum of $\theta_1$ and $\theta_4$ is 90 degrees or more.

8. The virtual image display device according to claim 1, wherein
the transmissive action part is configured to exert a diffractive action on the display light, which is from the display unit and is incident in the first polarization state, to diffract the display light and to bend a traveling direction of the display light, while exerting the transmissive action on the display light.

9. The virtual image display device according to claim 1, wherein
in a cross section taken along the vertical plane,
the display light, which is incident in the second polarization state, is emitted from the folding mirror toward the diffractive optical element at an incident angle $\theta_3$,
the display light, which is diffracted and reflected by the diffractive optical element, is emitted toward the projection portion at a reflection angle $\theta_4$, and
the incident angle $\theta_3$ and the reflection angle $\theta_4$ satisfy a relation of $\theta_3 > \theta_4$.

10. The virtual image display device according to claim 1, further comprising:
a polarization state conversion element placed between the diffractive optical element and the folding mirror and configured to convert the display light in the first polarization state to the second polarization state.

11. The virtual image display device according to claim 10, wherein
the polarization state conversion element is adhered to a reflection surface of the folding mirror.

12. The virtual image display device according to claim 10, wherein
the polarization state conversion element is adhered to a surface of the diffractive optical element on a side of the folding mirror.

13. The virtual image display unit according to claim 1, wherein
the folding mirror has a reflection surface in a convex shape.

14. The virtual image display unit according to claim 1, wherein
the diffractive optical element is a hologram element.

15. The virtual image display device according to claim 1, wherein
the transmissive action is the diffractive action.

16. The virtual image display device according to claim 1, wherein
the transmissive action part is configured to exert the transmissive action to transmit therethrough the display light, which is incident from the display unit and is in a first polarization state, toward the folding mirror, as in the first polarization state; and
the diffractive and reflective action part is configured to exert the diffractive and reflective action to diffract and reflect the display light, which is reflected by the folding mirror and is in a second polarization state opposite to the first polarization state, toward the projection portion on an optical path, as in the second polarization state.

17. The virtual image display device according to claim 1, wherein
the transmissive action part has the periodic refractive index distribution in the first cross section such that the refractive index is modulated at a predetermined cycle.

18. A virtual image display device configured to project a display light of an image on a projection portion to display a virtual image to be visible, the virtual image display device comprising:
a display unit configured to emit a display light, the display unit including a display screen and at least one polarizing plate;
a diffractive optical element configured to exert an diffractive action on the display light;
a folding mirror provided on an opposite side of the diffractive optical element from the display unit and configured to reflect the display light, wherein
the diffractive optical element includes:
a transmissive action part configured to exert a transmissive action to transmit therethrough the display light, which is incident from the display unit and is in a first polarization state, toward the folding mirror; and
a diffractive and reflective action part configured to exert a diffractive and reflective action to diffract and reflect the display light, which is reflected by the folding mirror and is in a second polarization state opposite to the first polarization state, toward the projection portion on an optical path, wherein
the display light in the first polarization state is a linearly polarized light polarized in a first direction,
the display light in the second polarization state is a linearly polarized light polarized in a second direction orthogonal to the first direction,
the diffractive optical element has a medium layer formed of a medium having a birefringence,
the transmissive action part has a periodic refractive index distribution in a first cross section including the first direction in the medium layer to exert a diffractive action due to interference fringes including a plurality of band-like regions to bend a traveling direction of the display light toward the folding mirror,
a transmission axis of the linear polarizing plate on a side of the display screen of the display unit is along a first direction,
each of the band-like regions is inclined at an angle larger than 45 degrees with respect to surfaces of the diffractive optical element in a counterclockwise direction when viewed along a second direction, which is perpendicular to the first direction and a thickness direction of the diffractive optical element and linearly extends, and
the diffractive and reflective action part has a refractive index distribution in a second cross section including a second direction in the medium layer, and
the refractive index distribution in the first section is defined by interference fringes modulated in a refractive index modulation direction that is inclined at an angle smaller than 45 degrees with respect to a thickness direction of the diffractive optical element.

19. The virtual image display device according to claim 18, wherein
the transmissive action part has the periodic refractive index distribution in the first cross section such that the refractive index is modulated at a predetermined cycle.

\* \* \* \* \*